United States Patent
Smith

(10) Patent No.: US 6,565,290 B2
(45) Date of Patent: May 20, 2003

(54) CARRIER BAG FOR PNEUMATIC DELIVERY SYSTEM

(75) Inventor: James F. Smith, Louisville, OH (US)

(73) Assignee: H-P Products, Inc., Louisville, OH (US)

( * ) Notice: Subject to any disclaimer, the term of this patent is extended or adjusted under 35 U.S.C. 154(b) by 0 days.

(21) Appl. No.: 09/910,225

(22) Filed: Jul. 20, 2001

(65) Prior Publication Data

US 2003/0016886 A1 Jan. 23, 2003

(51) Int. Cl.[7] .......................... B65G 51/06; B65D 33/02
(52) U.S. Cl. ...................... 406/188; 383/119; 383/121.1
(58) Field of Search .......................... 406/188; 383/119, 383/121.1

(56) References Cited

U.S. PATENT DOCUMENTS

| | | | | |
|---|---|---|---|---|
| 2,464,069 A | * | 3/1949 | Benson | 383/121.1 |
| 3,188,018 A | * | 6/1965 | Van Otteren | 406/188 |
| 3,331,569 A | * | 7/1967 | Kelley | 406/188 |
| 3,612,438 A | * | 10/1971 | Herndon | 406/188 |
| 4,219,290 A | * | 8/1980 | Golston | 406/188 |
| 4,240,769 A | * | 12/1980 | Diaz | 406/188 |
| 4,324,511 A | * | 4/1982 | Irish | 406/188 |
| 5,181,807 A | * | 1/1993 | Anders | 406/188 |
| 5,308,666 A | * | 5/1994 | Borchardt | 428/35.2 |
| 5,538,366 A | * | 7/1996 | Piland et al. | 406/190 |
| 5,573,356 A | * | 11/1996 | Henderson | 406/186 |
| 5,901,966 A | * | 5/1999 | Valerino, Sr. et al. | 406/190 |

\* cited by examiner

Primary Examiner—Stephen P. Garbe
(74) Attorney, Agent, or Firm—Sand & Sebolt

(57) ABSTRACT

A carrier for a pneumatic delivery system includes a bag-shaped body that is fabricated from a flexible material. The carrier includes a sealing plate and a weight disposed at the front of the body and an alignment ring disposed toward the rear of the body. The carrier is adapter to be moved through the ducts of a pneumatic delivery system without becoming stuck in the system.

22 Claims, 4 Drawing Sheets

CARRIER BAG FOR PNEUMATIC DELIVERY SYSTEM

BACKGROUND OF THE INVENTION

1. Technical Field

The present invention relates generally to pneumatic delivery systems of the type intended for delivering small packages from one location to another and, more particularly, to a carrier that is used to carry items within the pneumatic delivery system. Specifically, the carrier is in the form of a small, flexible carrier bag having a sealing plate, and a weight at the front of the bag and a flexible alignment ring at the rear of the bag.

2. Background Information

Numerous types of pneumatic delivery systems are known and understood in the relevant art. Pneumatic delivery systems typically include a duct system manufactured out of tubes having a circular cross section for delivering containers from initial locations to terminal locations. Such systems operate by applying a vacuum and/or a positive air pressure above ambient pressure to the duct system and, in turn, to the container therein to pneumatically draw and/or push the carrier bag through the duct system from the initial location to the terminal location.

Such pneumatic delivery systems typically are of either a one-way configuration or a two-way configuration. The one-way configuration is employed whenever delivery is desired only from an initial location to a terminal location. The return of any materials from the terminal location to the initial location must be achieved by hand carrying or through other delivery mechanisms. Such systems are particularly useful, for example, when small packages repeatedly need to be delivered from various locations to a central delivery location such as when numerous cashiers need to periodically deliver packages of cash and checks from cashier locations to a centralized accounting location.

Containers that have been with used with such prior art pneumatic delivery systems have been of a substantially rigid cylindrical configuration with resilient bumpers at one or both ends. Such containers are designed to minimize the leakage of air past the container from the vacuum and/or high pneumatic pressure which, in turn, helps to ensure that the container is delivered through the duct and does not become stuck. The bumpers are provided at the ends of the container to minimize the shock to the container and to minimize the likelihood of injury and property damage at the terminal location when the container is pneumatically delivered out of the outlet of the pipe inasmuch as the container is typically delivered from the outlet of the pipe at a relatively high speed and with a substantial amount of energy. Inasmuch as such carriers have needed to be rigid and include the aforementioned resilient bumpers, such carriers have been relatively heavy compared to the materials that they carry.

SUMMARY OF THE INVENTION

In view of the foregoing, an objective of the present invention is to provide a flexible carrier bag for a pneumatic delivery system.

Another objective of the invention is to provide a flexible carrier bag that forms a seal with the transfer tube so that the bag may be easily moved through the tube.

Another objective of the invention is to provide a flexible carrier bag having a weight that provides momentum to the bag as it moves through the delivery system.

Another objective of the invention is to provide a flexible carrier bag that may be collapsed when stored so that it occupies a minimal amount of storage space.

Another objective of the invention is to provide a flexible carrier bag having a sealing plate at its front and an alignment ring at its rear.

Another objective of the invention is to provide a flexible carrier bag that is lightweight.

Another objective of the invention is to provide a flexible carrier bag that is easy to open and close.

These and other objectives and advantages of the invention are achieved by a carrier adapted to carry a quantity of cargo, the carrier adapted to be transferred from an initial location to a terminal location by a pneumatic delivery system, the carrier including of a body adapted to carry the cargo, a sealing plate disposed at the front of the body, and an alignment ring attached to the body and spaced from the sealing plate.

Other objectives and advantages of the invention are achieved by a carrier having a body that defines an interior cavity, the body having an opening that is selectively openable and closeable with the body being fabricated from a flexible material.

BRIEF DESCRIPTION OF THE DRAWINGS

The preferred embodiment of the invention, illustrative of the best mode in which Applicant has contemplated applying the principles of invention, is set forth in the following description and is shown in the drawings and is particularly and distinctly pointed out and set forth in the appended Claims.

Similar numerals refer to similar parts throughout the specification.

DESCRIPTION OF THE PREFERRED EMBODIMENTS

Figure 1:
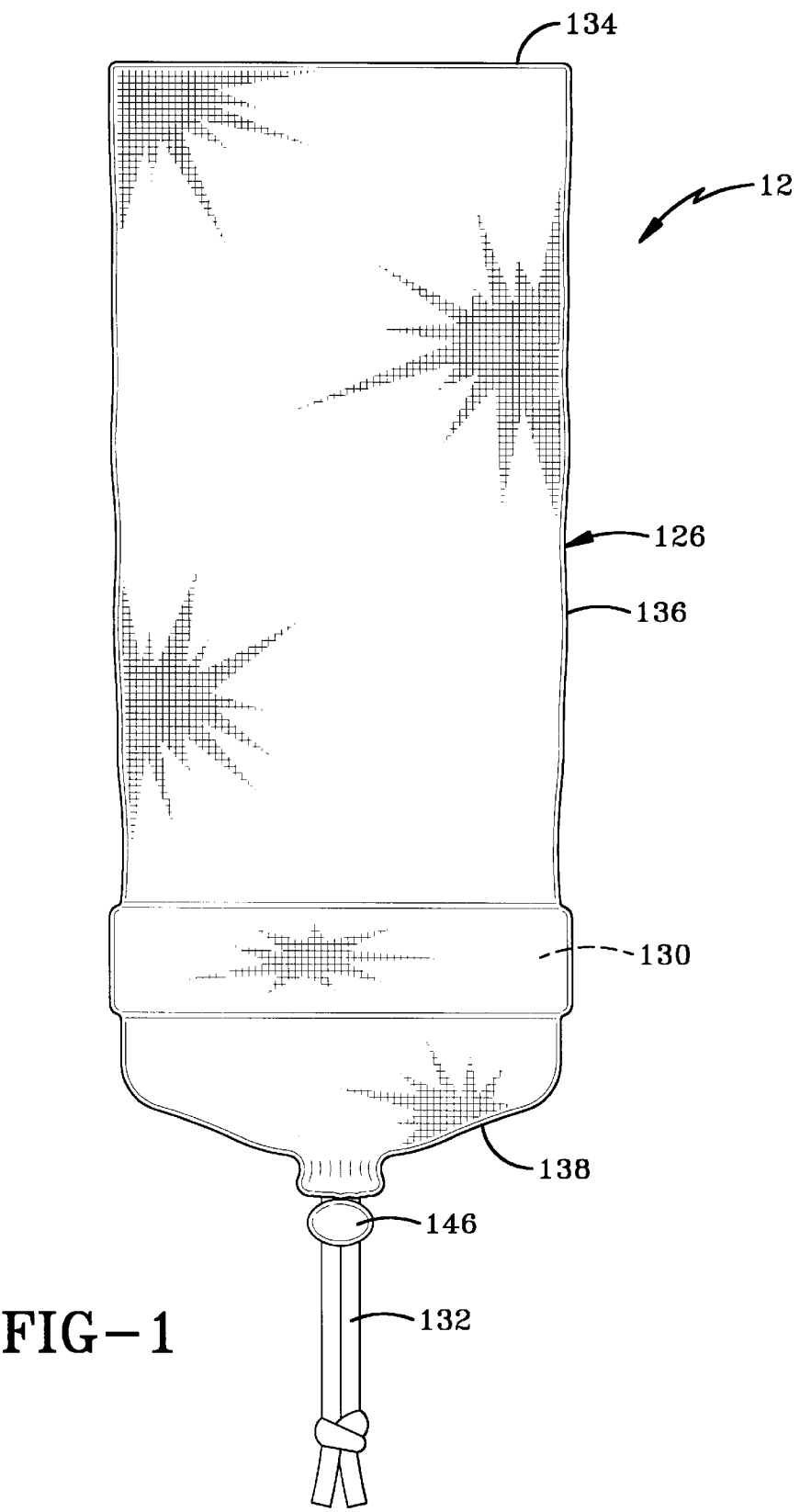
FIG. 1 is a front view of the carrier bag of the present invention.
Figure 2:
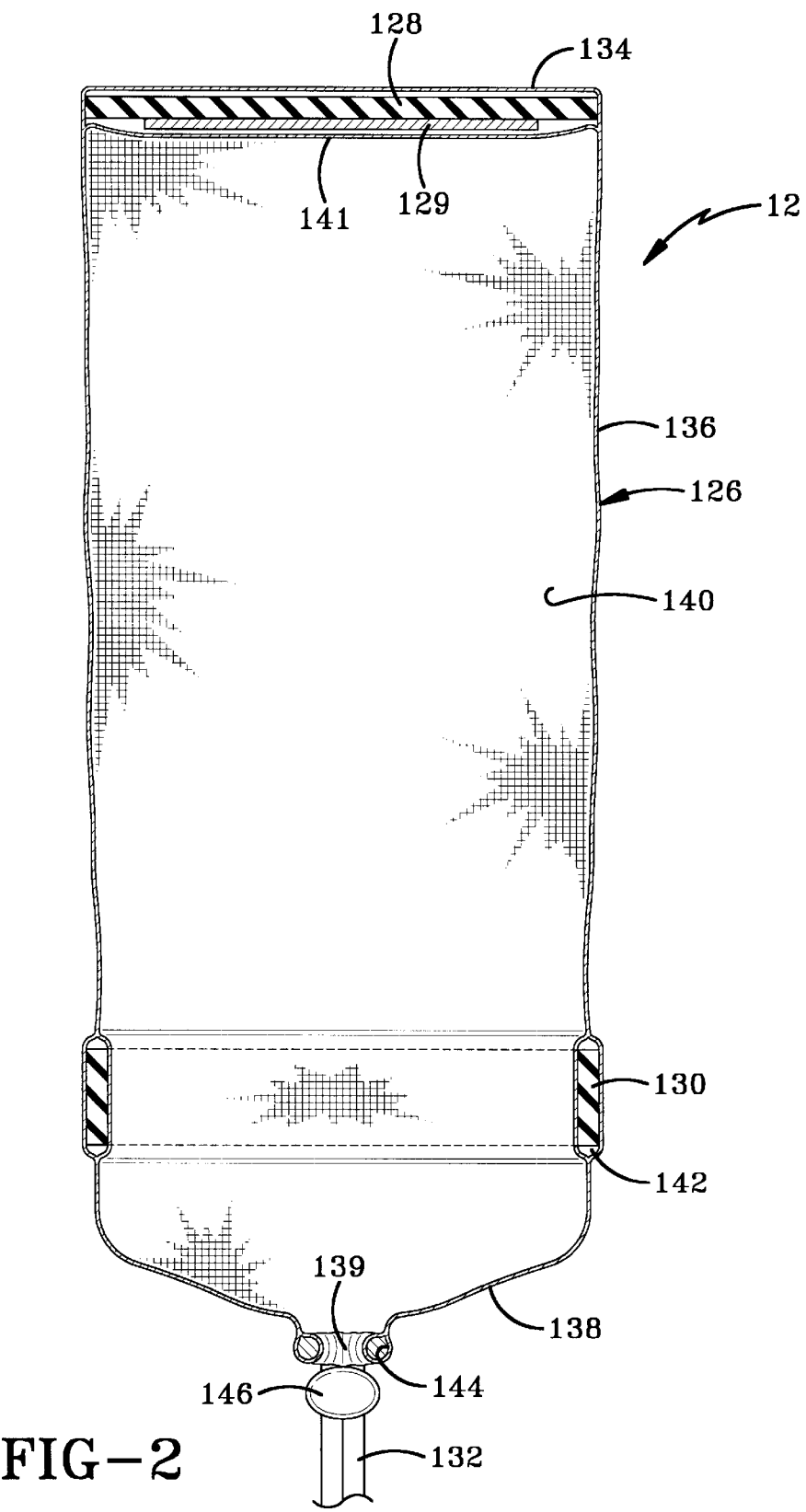
FIG. 2 is a sectional view of the carrier bag of the present invention.

The carrier of the present invention is indicated generally by the numeral 12 in the accompanying drawings. Carrier bag 12 is configured to travel through a duct system 14 with minimal air leakage and minimal friction between carrier bag 12 and duct system 14. Carrier bag 12 is configured to be flexible enough to travel around corners without becoming jammed. Carrier bag 12 may also be collapsed while not in use to allow it to be stored in a small space.

Carrier bag 12 includes a flexible body 126, a sealing plate 128, a weight 129, an alignment ring 130, and a drawstring 132. Body 126 is preferably in the form of a bag having a sidewall with a closed end wall. Sealing plate 128 and weight 129 are preferably disposed at the closed end wall of body 126. The sidewall of body 126 is preferably substantially cylindrical so that it substantially matches the interior of the ducts through which it is designed to travel.

Body 126 is a thin-walled, flexible and preferably substantially inelastic material such as fiber-reinforced plastic, plastic-coated fabric, nylon, cloth, or other such material. Body 126 includes a generally planar front 134, a substantially cylindrical sidewall 136, and a rear 138 having a substantially circular entryway 139 that is selectively opened and closed by operation of drawstring 132, as will be set forth more fully below. An interior cavity 140 of body 126 is defined between front 134, rear 138, and sidewall 136.

Sealing plate 128 is a substantially circular, planar member having a width substantially greater than its thickness. Sealing plate 128 is manufactured of a resilient flexible or semi-flexible material such as rubber, although other resilient materials may be used without departing from the spirit of the present invention. Weight 129 is a thin plate of relatively heavy material such as steel, although other appropriate materials may be used depending upon the needs of the current configuration and the pneumatic characteristics of power units 10 and duct system 14. Sealing plate 128 and weight 129 are disposed flush against one another, with sealing plate 128 disposed flush against an interior surface of front 134 such that weight 129 faces toward interior cavity 140. Body 126 also includes a substantially circular flap 141 that is disposed against weight 129 within interior cavity 140 to retain sealing plate 128 and weight 129 against front 134.

An annular alignment ring channel 142 is formed in sidewall 136 by a channel flap 143 adjacent rear 138. Alignment ring 130 is disposed in alignment ring channel 142. Alignment ring 130 is an annular flexible or semi-flexible material such as polyethylene or polypropylene, although other materials may be used without departing from the spirit of the present invention. Alignment ring 130 assists in retaining sidewall 136 in a cylindrical configuration and has an outer diameter that is sized to retain sidewall 136 disposed substantially flush against an inner surface of duct 14 with minimal air leakage and friction therebetween while traveling through duct 14.

Body 126 is also formed with a string channel 144 that is sized to slidingly carry drawstring 132. String channel 144 extends circumferentially around sidewall 136 at an end thereof opposite front 134. Entryway 139 is circumscribed by string channel 144. Inasmuch as body 126 is flexible, drawstring 132 can be pulled through string channel 144 to minimize the size of entryway 139 to enclose a quantity of cargo within interior cavity 140 of carrier bag 12. A clip 146 is provided to retain drawstring 132 in a selected position. Likewise, clip 146 can be detached or deactivated to permit drawstring 132 to selectively slide through string channel 144 to enlarge entryway 139 for insertion or removal of the cargo 150 into and out of interior cavity 140.

Figure 3:
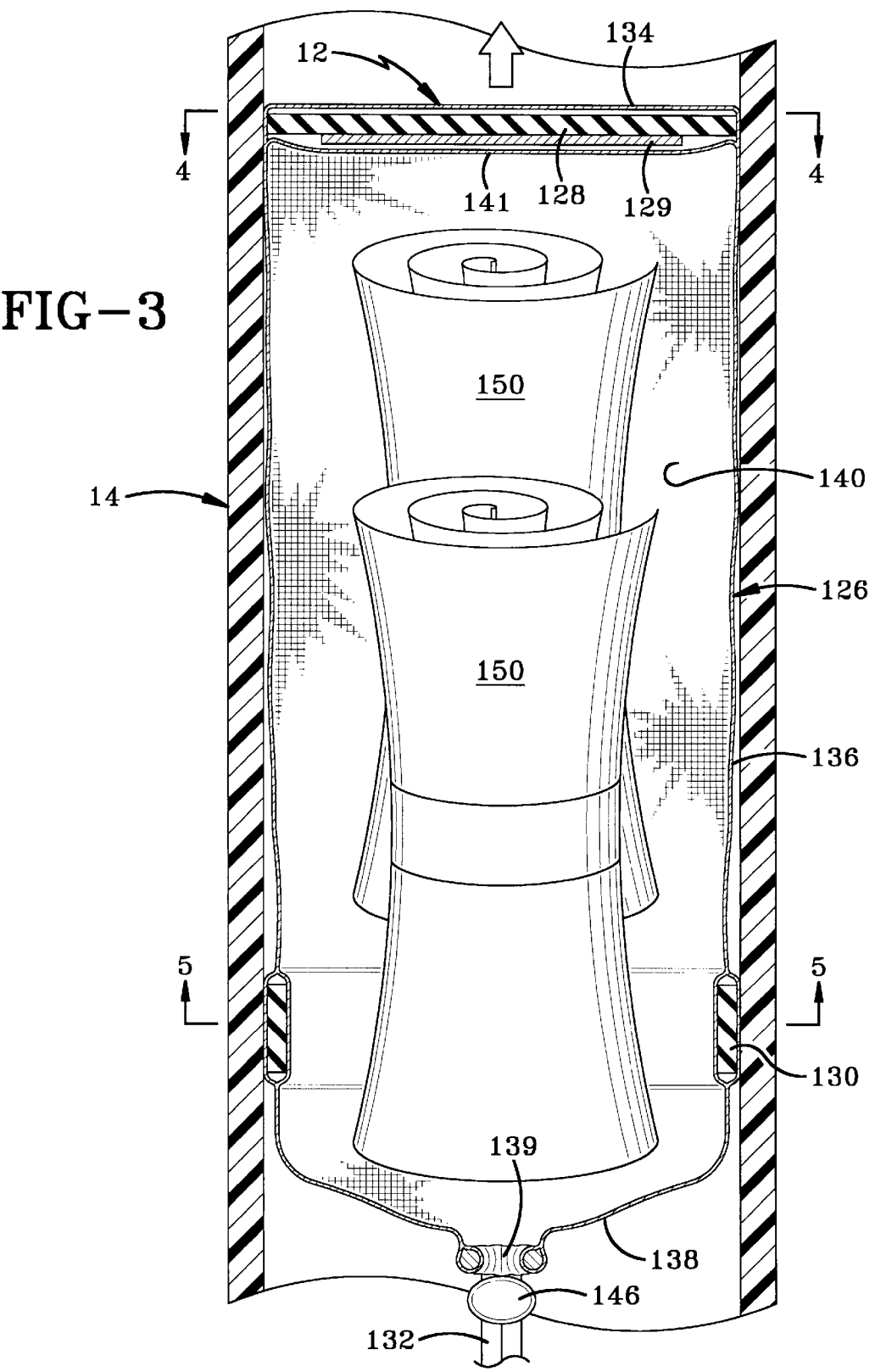
FIG. 3 is a sectional view of the carrier bag holding items in a transfer tube.
Figure 4:
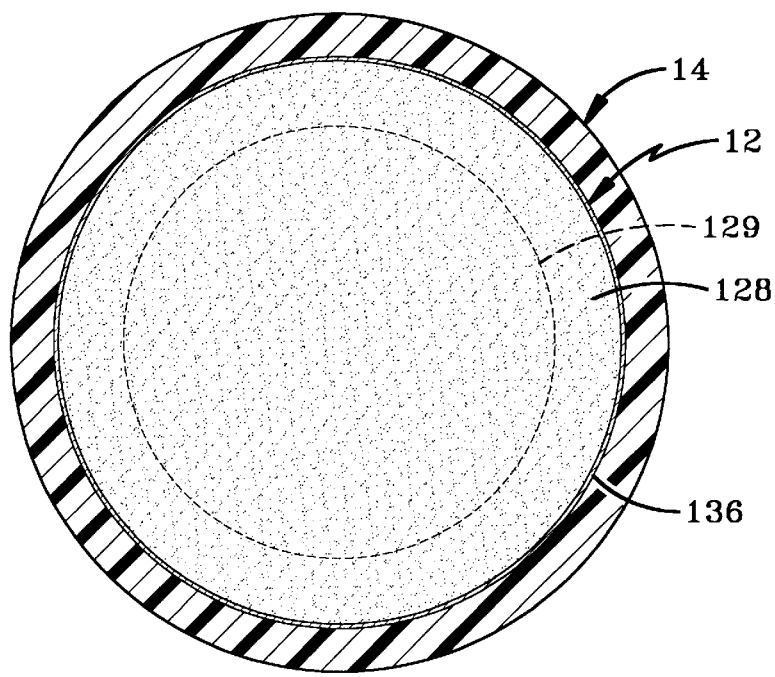
FIG. 4 is a sectional view taken along line 4—4 of FIG. 3.
Figure 5:
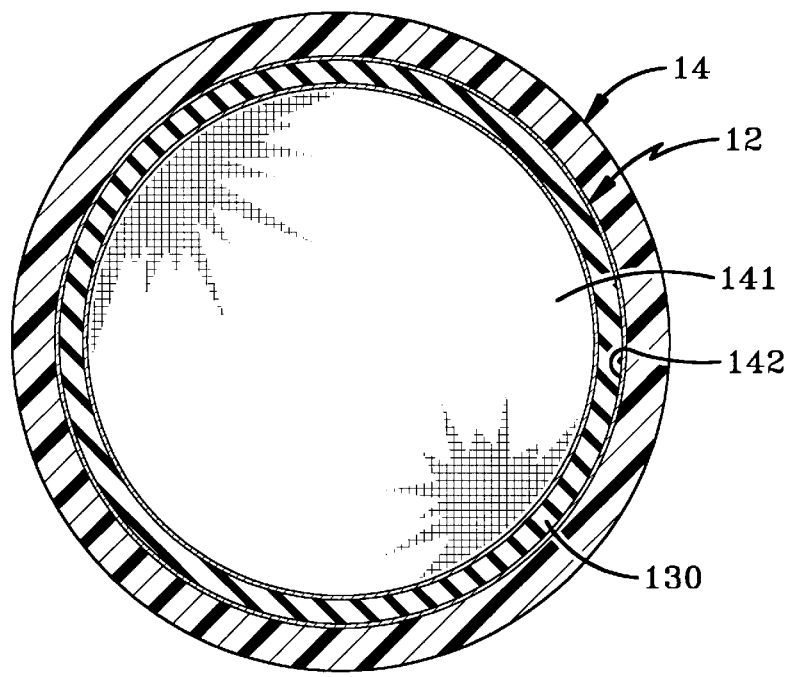
FIG. 5 is a sectional view taken along line 5—5 of FIG. 3.

As shown in FIGS. 3–5, sealing plate 128 combined with the thickness of body 126 has a diameter substantially equal to the inner diameter of duct 14 so that the vacuum flow will readily pull bar 12 through duct 14. Alignment ring 130 and body 126 are also sized to be slightly smaller than the inner diameter of duct 14.

The pneumatic delivery system used with carrier 12 of the present invention is configured to deliver small packages or bundles from an initial location to a terminal location. The pneumatic delivery system may be installed in indoor applications, outdoor applications, as well as combinations of indoor and outdoor applications, such as combined applications wherein portions of the system are installed indoors and other portions are installed outdoors, as well as systems extending between detached buildings. Carrier 12 may be used in this system to carry the packages or bundles from location to location as desired by the user.

The flexible nature of body 126, sealing plate 128 and alignment ring 130 permits carrier bag 12 to travel through the tubing sections without becoming stuck. Additionally, weight 129 provides inertia to carrier bag 12 to facilitate the travel of carrier 12 through any Y-shaped tubing sections 50 and any sweeping elbow tubing sections where a carrier might otherwise become stuck. Weight 129 is particularly useful when the cargo disposed within carrier 12 is lightweight.

By configuring alignment ring 130 to flexibly and resiliently be of an annular shape, alignment ring 130 automatically axially aligns itself with the interior of the duct system 14. Inasmuch as carrier 12 is configured such that alignment ring 130 is axially disposed with an imaginary line extending perpendicularly from the center of sealing plate 128, with sealing plate 128 being perpendicular to the imaginary line, the axial alignment of alignment ring 130 within duct system 14 retains sealing plate 128 and thus front 134 in an orientation perpendicular with the interior of duct system 14 which limits the leakage of air between sealing plate 128 and duct system 14.

Accordingly, the improved carrier for the pneumatic delivery system is simplified, provides an effective, safe, inexpensive, and efficient device that achieves all the enumerated objectives, provides for eliminating difficulties encountered with prior devices and methods, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention us by way of example, and the scope of the invention is not limited to the exact details shown or described.

Having now described the features, discoveries and principles of the invention, the manner in which the carrier is constructed, used and carried out, the characteristics of the system and method, and the advantageous, new and useful results obtained; the new and useful structures, devices, elements, arrangements, parts, combinations and method steps, are set forth in the appended claims.

What is claimed is:

1. A carrier adapted to carry a quantity of cargo, the carrier adapted to be transferred from an initial location to a terminal location by a pneumatic delivery system, said carrier comprising:

a body adapted to carry the cargo;

a sealing plate disposed at the front of the body;

an alignment ring attached to the body and spaced from the sealing plate; and the body including a flap forming a pocket that carries the sealing plate.

2. The carrier of claim 1 wherein the body is fabricated from a flexible material.

3. The carrier of claim 1 wherein the flap is fabricated from a flexible material.

4. The carrier of claim 1, wherein the body has an opening formed at the rear portion of the body.

5. The carrier of claim 4, further comprising a drawstring carried by the body around the opening at the rear of the body.

6. The carrier of claim 1, wherein the body is of a substantially cylindrical shape, the sealing plate is substantially circular, and the alignment ring is substantially annular in shape.

7. The carrier of claim 6, wherein the sealing plate is flexible.

8. The carrier of claim 1, further comprising a weight disposed at the front of the body.

9. The carrier of claim 8, wherein the weight is inside the pocket.

10. The carrier of claim 9, wherein the weight is a thin plate.

11. The carrier of claim 10, wherein the weight is disposed flush against the sealing plate.

12. A carrier adapted to carry a quantity of cargo, the carrier adapted to be transferred from an initial location to a terminal location by a pneumatic delivery system, said carrier comprising:

a body adapted to carry the cargo;

a sealing plate disposed at the front of the body;

an alignment ring attached to the body and spaced from the sealing plate; and the body including a channel flap that defines a channel that carries the alignment ring.

13. The carrier of claim 12 wherein the body is fabricated from a flexible material.

14. The carrier of claim 12 wherein the flap is fabricated from a flexible material.

15. The carrier of claim 12, wherein the body has an opening formed at the rear portion of the body.

16. The carrier of claim 15, further comprising a drawstring carried by the body around the opening at the rear of the body.

17. The carrier of claim 12, wherein the body is of a substantially cylindrical shape, the sealing plate is substantially circular, and the alignment ring is substantially annular in shape.

18. The carrier of claim 17, wherein the sealing plate is flexible.

19. The carrier of claim 12, further comprising a weight disposed at the front of the body.

20. The carrier of claim 19, wherein the weight is inside the pocket.

21. The carrier of claim 20, wherein the weight is a thin plate.

22. The carrier of claim 21, wherein the weight is disposed flush against the sealing plate.

* * * * *